(12) United States Patent
Parulkar

(10) Patent No.: US 8,065,597 B1
(45) Date of Patent: Nov. 22, 2011

(54) SELF TEST OF PLESIOCHRONOUS INTERCONNECT

(75) Inventor: Ishwardutt Parulkar, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 1172 days.

(21) Appl. No.: 11/773,994

(22) Filed: Jul. 6, 2007

(51) Int. Cl.
*G06F 11/00* (2006.01)
(52) U.S. Cl. ........................ 714/798; 708/250
(58) Field of Classification Search .................. 714/798; 708/250
See application file for complete search history.

(56) References Cited

U.S. PATENT DOCUMENTS

2005/0071399 A1* 3/2005 Bonaccio et al. ............ 708/250
2008/0114562 A1* 5/2008 Sul et al. ...................... 702/122

OTHER PUBLICATIONS

Braden, et al., "Use of BIST in Sun Fire Servers," Test Conference Proceedings International 2001, Baltimore, Maryland, pp. 1017-1022.
"PCI Express Base Specification Revision 2.0," PCI Express, Dec. 20, 2006, pp. 191-237.
Hamdioui, et al, "Testing Static and Dynamic Faults in Random Access Memories," Proceedings of the 20th IEEE VLSI Test Symposium (VTS '02), pp. 1-6.

* cited by examiner

*Primary Examiner* — Sam Rizk
(74) *Attorney, Agent, or Firm* — Meyertons, Hood, Kivlin, Kowert & Goetzel, P.C; Erik A. Heter

(57) ABSTRACT

A method and apparatus for performing a self-test of a plesiochronous link. A pseudorandom serial bit pattern is generated by the transmitter from a linear feedback shift register (LFSR) based on a primitive polynomial of a specific order and transmitted across a plesiochronous link. Bits of this transmitted pattern are received and deserialized into n parallel bits. In the receiver, given the current n bits in the bit pattern, the next n bits that are expected in the bit pattern are computed in advance. The next n compare bits thus generated are delayed and compared when the next n bits from the transmitted pattern arrive at the receiver and an error is signaled in the case of a mismatch. The method further repeats the receiving, deserializing and computing the next expected bits for each n bits of the received pattern.

20 Claims, 5 Drawing Sheets

SELF TEST OF PLESIOCHRONOUS INTERCONNECT

BACKGROUND OF THE INVENTION

1. Field of the Invention

This invention relates to the testing of interconnects in an electronic system, and more particularly, to the testing of high-speed links.

2. Description of the Related Art

Plesiochronous signaling is a form of high-speed signaling capable of transfer rates of up to 10 Gbits/s over a single interconnection. As such, plesiochronous links are capable of significantly higher data transfer speeds than traditional synchronous links (synchronized to a global clock) or source synchronous links (synchronized by a clock transmitted concurrently with the data). Instead of relying on a separate clock signal, plesiochronous links utilize an embedded clock signal, which is recovered from transmitted data by a clock-and-data recovery (CDR) circuit.

Due to the high data transfer rates and the embedded clock, plesiochronous links may be more susceptible to certain failures than synchronous or source synchronous links. The modes of failure include sensitivity to cross-talk, inter-symbol interference, jitter, and power supply glitching. Accordingly, testing of plesiochronous links must exercise the links in order to exercise these failure modes.

The nature of plesiochronous data transfer poses challenges in the testing process that are not present with synchronous and source synchronous links. In an assembled system utilizing plesiochronous signaling, the links may be tested by transmitting data from a transmitter over the links to a receiver. However, since there is no reference clock or forwarded clock associated with a plesiochronous link, synchronization between the transmitter and the receiver poses a problem in correctly interpreting the transmitted data in order to compare it with expected data. These challenges must be overcome in order to ensure sufficient testing of systems utilizing plesiochronous signaling.

SUMMARY OF THE INVENTION

A method and apparatus for performing a self-test of a plesiochronous link is disclosed. In one embodiment, a pseudorandom serial bit pattern is generated by the transmitter from a linear feedback shift register (LFSR) based on a primitive polynomial of a specific order (such as 7, 23 or 31), and transmitted across a plesiochronous link. In the receiver, a plurality of n compare bits is generated based received plurality of n bits after being deserialized into n parallel bits. The receiver employs a polynomial generator circuit with the same polynomial as the transmitter. Given the current n bits in the bit pattern, the polynomial generator circuit computes in advance the next n bits that are expected in the bit pattern. The method further repeats the receiving, deserializing and computing the next expected bits for each n bits of the received pattern.

A system configured for performing self-tests of a plesiochronous link is also disclosed. The system includes a pseudorandom bit pattern generator, and a transmitter configured to transmit a generated first pseudorandom bit pattern. The pseudorandom bit pattern is transmitted over a plesiochronous link to a receiver. The n parallel bits are received by a pseudorandom bit pattern verifier and used as a basis for generating n compare bits that get compared with the next n incoming bits. A comparator is coupled to the n generated compare bits and the next n bits received from the deserializer, and is configured to compare these two groups of bits and signal an error in case they do not match.

Based on repeated comparisons, a bit error rate (BER) is generated. In one embodiment, a BER counter is coupled to the comparator. The counter is toggled for each instance when the n compare bits does not match the received n bits. However, during an initialization period, an errors detected by the bits not matching may be ignored while the first and second pseudorandom bit patterns synchronize. A delay element may be present between the second pseudorandom bit pattern generator to ensure that the bits received are compared to the correct group of expected bits.

BRIEF DESCRIPTION OF THE DRAWINGS

Other aspects of the invention will become apparent upon reading the following detailed description and upon reference to the accompanying drawings in which.

Figure 1:
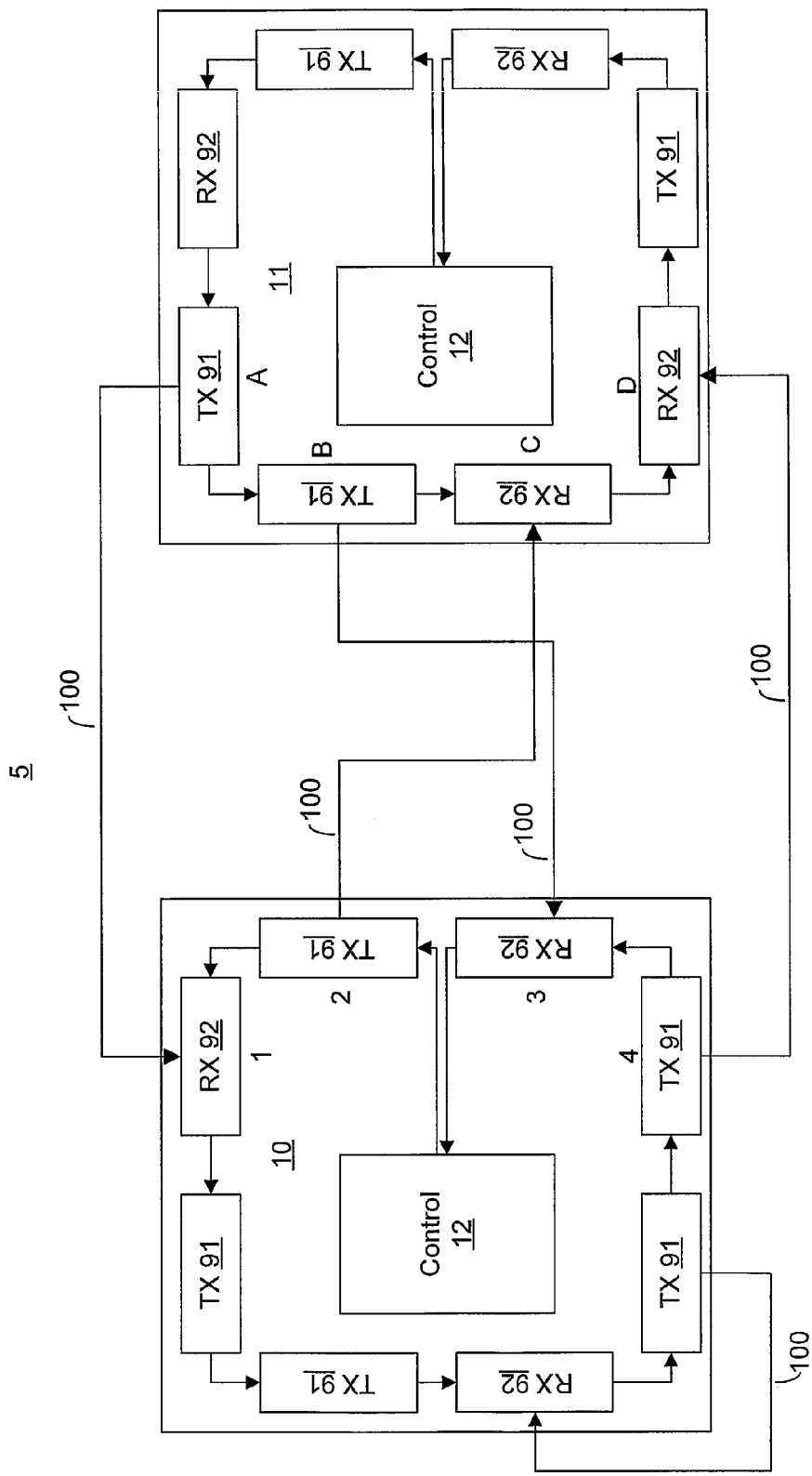
FIG. 1 is a block diagram block diagram of one embodiment of a system including a pair of integrated circuits coupled to each other by plesiochronous links.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Turning now to FIG. 1, a block diagram block diagram of one embodiment of a system including a pair of integrated circuits coupled to each other by plesiochronous links is shown. For the sake of simplicity, the core logic and other functional units are not shown, although their presence is understood. In the embodiment shown, system 5 includes a first chip (i.e. integrated circuit) 10 and a second chip 11. Chips 10 and 11 are coupled to each other by plesiochronous links 100. An additional plesiochronous link 100 is coupled between a transmitter and a receiver on chip 10, and thus acts as a loopback. The loopback link may be temporary or permanent, and may enable various embodiments of the self-test described below to be conducted for a transmitter and a receiver on the same chip.

Each chip includes a plurality of transmitters ('TX') 91 configured to transmit data over its corresponding plesiochronous link to a receiver ('RX') 92. Each receiver 92 may include a clock and data recovery (CDR) circuit, a type of circuit that is well known in the art of plesiochronous signaling. At least one of the receivers 92 and at least one of the transmitters 91 on each of the chips are coupled to a control unit 12. The control unit 12 in each of chips 10 and 11 may initiate self-testing of the plesiochronous links 100.

In one embodiment, multiple plesiochronous links 100 may be tested concurrently in order to exercise certain failure modes, such as cross-talk and inter-symbol interference. In one such example sequence, test generators in transmitters A followed by B (on chip 11) may be initialized, followed by the initialization of test generators in of transmitters 2 and 4 (on chip 10). Responsive to initializing the test generators, test verifiers may be initialized in receivers C followed by D and 1 followed by 3. As a result, multiple plesiochronous links are tested concurrently, thereby exercising failure modes that would otherwise not be exercised if each link it tested singly.

Figure 2:
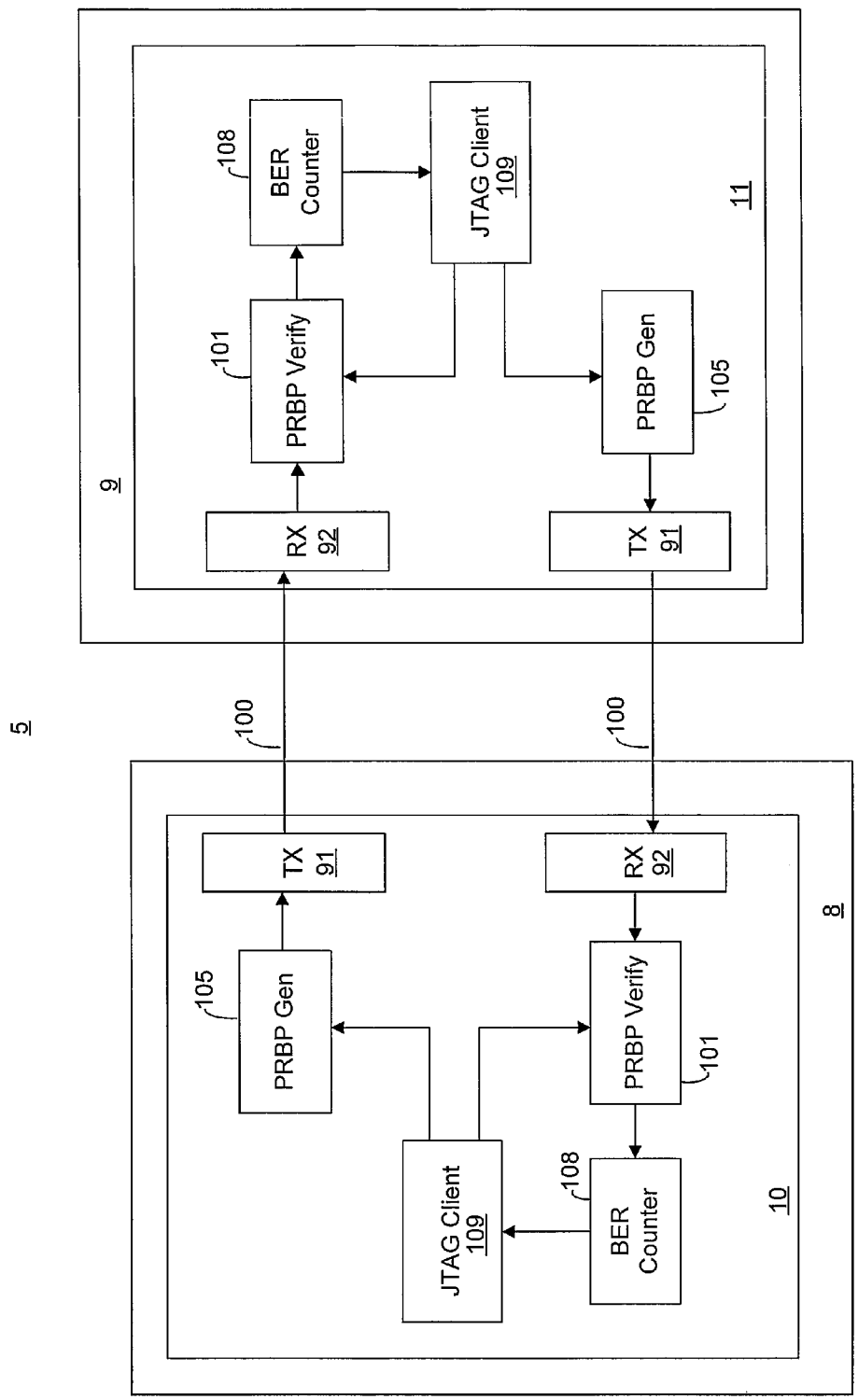
FIG. 2 is a block diagram of one embodiment of a system including a pair of integrated circuits mounted on different PCB's (printed circuit boards) and coupled to each other by plesiochronous links and configured to perform self-tests of the links.

FIG. 2 is a block diagram of one embodiment of a system including a pair of integrated circuits (i.e. 'chips') mounted on different PCB's (printed circuit boards) and coupled to each other by plesiochronous links and configured to perform self-tests of the links. FIG. 2 also illustrates additional details of the integrated circuits, which are configured for conducting self-tests over plesiochronous links.

In the embodiment shown, chip 10 is mounted upon PCB 8, while chip 11 is mounted upon PCB 9. It is noted that the drawing shown in FIG. 2 is exemplary and does not necessarily represent the comparative sizes of the chips to the PCBs. In other words, additional components, including other chips, may also be present on the PCBs, although they are not shown here for the sake of simplicity.

Each chip shown in the drawing includes a JTAG (Joint Test Action Group) client 109, at least one transmitter 91, a PRBP (pseudorandom bit pattern) generator 105, a PRBP verification unit 101, at least one receiver 92, and a BER (bit error rate counter). The JTAG clients 109 in chips 10 and 11 may be used to initiate a self-test of the plesiochronous links 100. In each of the chips 10 and 11, the JTAG client 109 may invoke the PRBP generator 105 to generate a pseudorandom bit pattern. The pseudorandom bit pattern may, in one embodiment, be generated by seeding a linear feedback shift register (LFSR) with a primitive polynomial. The generated pseudorandom bit pattern generated by each PRBP generator 105 is then received by its associated transmitter 91 and transmitted serially of its associated plesiochronous link 100.

On the receive side of each plesiochronous link 101, the JTAG client 109 may initiate generation of a pseudorandom bit pattern in PRBP verifier 101. Each PRBP verifier 101 may be similar to its counterpart PRBP generator 105 in that it includes an LFSR configured to generate a pseudorandom bit patter. Moreover, the LFSR in the PRBP verifiers 105 may be seeded with the same primitive polynomial as their counterpart PRBP generators. A pseudorandom bit pattern, while appearing random, is actually a deterministic pattern. Thus, if two identical LFSRs are seeded with the same primitive polynomial they will in theory generate the same bit pattern. Thus, by seeding an LFSR in each PRBP verifier 101 with the same primitive polynomial as its counterpart PRBP generator 105, a basis for comparing the transmitted pseudorandom bit pattern with the expected results is provided. Thus, bits of the pseudorandom bit pattern generated by each of the PRBP verifiers 101 are compared by the verifier with bits of the incoming pseudorandom bit pattern transmitted over the associated plesiochronous link 100 in order to determine if any errors are present. The generation of pseudorandom bit patterns and the comparison of expected with received results will be discussed in further detail below.

Each PRBP verifier 101 in the embodiment shown is coupled to a BER counter 108. Each BER counter 108 may be for each error that is detected, and may also be further incremented to calculate a bit error rate. Alternatively, each BER counter 108 may provide the count to its associated JTAG client 109, which may then calculate the bit error rate. The bit error rate may be calculated, in one embodiment, by dividing the number of bit errors detected by the PRBP verifier 101 (as indicted by the count of the BER counter 108) divided by the total number of bits transmitted. A passing test result may be indicated if the bit error rate is less than a predetermined threshold, while a failing test result may be indicated if the bit error rate is greater than a predetermined threshold.

Figure 3:
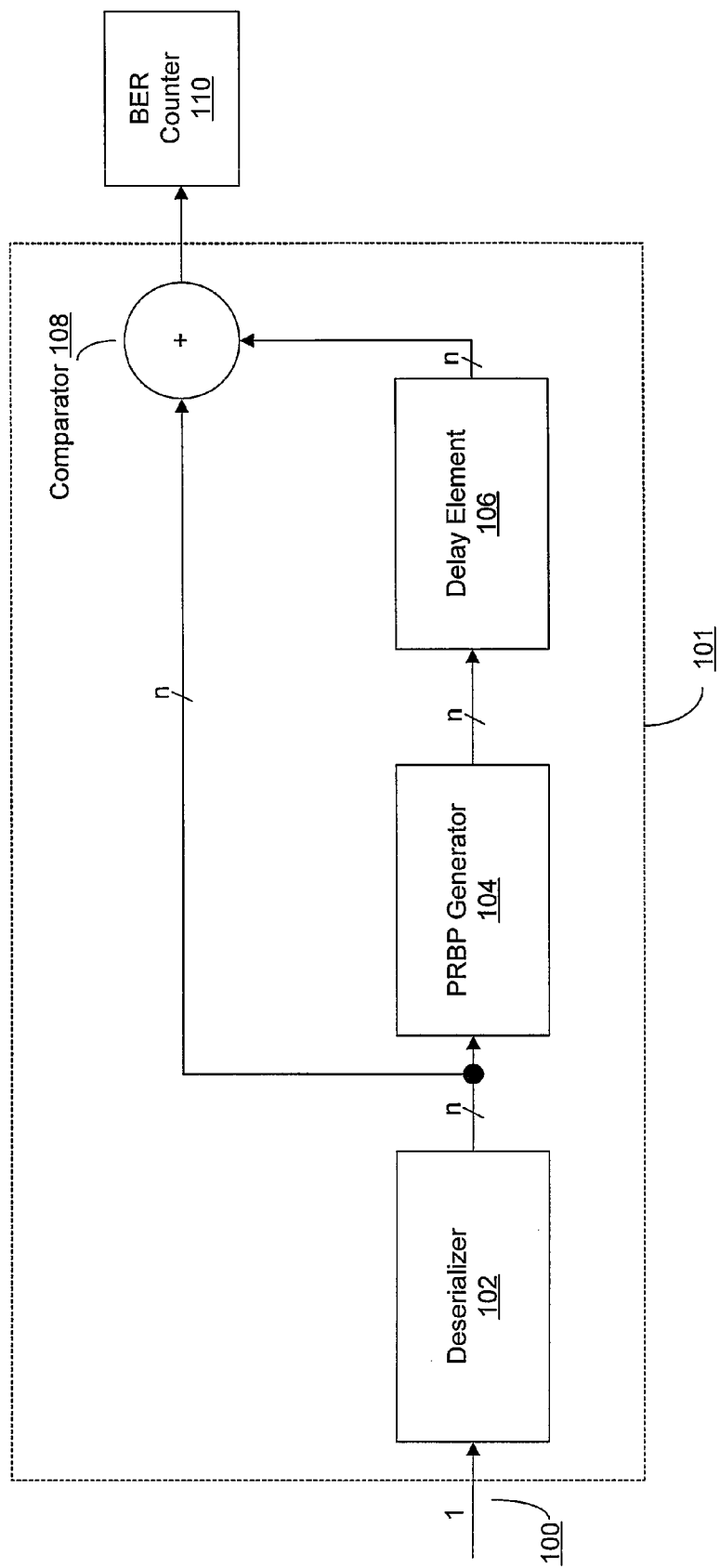
FIG. 3 is a block diagram illustrating one embodiment of an apparatus configured for receiving and determining self-test results for a plesiochronous link.

FIG. 3 is a block diagram illustrating one embodiment of an apparatus configured for receiving and determining self-test results for a plesiochronous link. It should be noted that receiver 101 may include additional components not shown here. For the sake of simplicity, only those components required for the self-test described herein are shown.

In the embodiment shown, receiver 101 includes a deserializer 102 that is coupled to receive bits serially transmitted over a plesiochronous link. For every n bits received (e.g., for every 8 bits) deserializer 102 captures and stores the bits so that they can be transmitted in parallel. Each captured n bits may then be transmitted in parallel to PRBP (pseudorandom bit pattern) generator 104. The captured n bits are also transmitted to a comparator 108.

By capturing bits and transmitting them in parallel, it may be easier to synchronize the bits incoming pseudorandom bit pattern with the expected data generated by the PRBP generator 104. This is due in part to the fact that expected data is generated based on both a primitive polynomial as well as the incoming bits, upon which subsequent iterations of the expected data bits are generated. Bits received by PRBP generator 104 may be used as the basis for comparison with the next n incoming bits. Once the next expected n bits are generated, they may be forwarded to delay element 106. Upon receiving the next expected n bits, delay element 106 delays the bits before conveying to comparator 108. Upon receiving both the next received n bits from deserializer 102 and the next expected n bits from delay element 106, comparator 108 compares the expected bits to the received bits to determine whether any errors are present. If an error is present (e.g., expected and received bits are different), comparator 108 provides an indication to BER counter 110, which keeps a count of the errors for computing a bit error rate.

The process described above may be repeated for each received n bits of the transmitted pseudorandom bit pattern. In the embodiment shown, each received n bits is compared to a corresponding expected n bits, which is provided to comparator 108 by PRBP generator 104 via delay element 106. Each received n bits is further used to generate the next expected n bits in PRBP generator 104.

It should be noted that, for a certain period after startup of the test, errors may be present until the bit patterns generated on the transmit side and receiving side (which are seeded with the same primitive polynomial) are synchronized with each other. During this time, errors detected by comparator 108 may be ignored. This may be accomplished by disabling BER counter 110, configuring comparator 108 to ignore errors during the initialization period, or by any other suitable method. Furthermore, if for a given cycle of comparison, an error is detected, errors for a number of subsequent cycles may be ignored afterward, as an error will cause the subsequent next n compare bits to be in error as well. However, the bit patterns generated on both the transmit and receive sides should synchronize with each other after a certain number of cycles if no additional errors are present therein.

Figure 4:
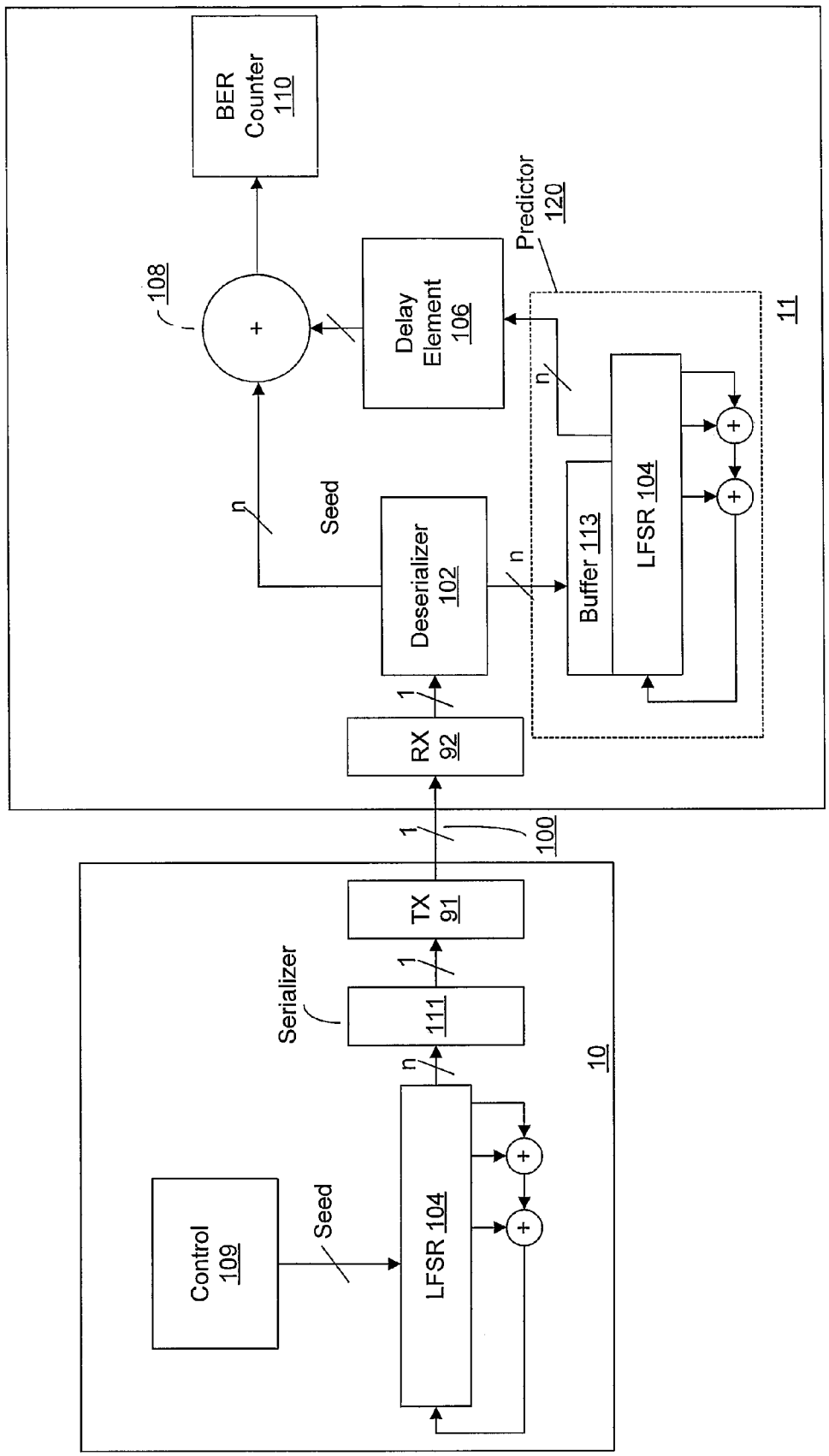
FIG. 4 is a block diagram illustrating additional details of one embodiment of a plesiochronous link configured for self-test.

FIG. 4 is a block diagram illustrating additional details of one embodiment of a plesiochronous link configured for self-test. In the embodiment shown, chips 10 and 11 are coupled by a plesiochronous interconnect that includes plesiochronous link 100. More particularly, chips 10 and 11 are configured for conducting a self-test of the plesiochronous interconnect. Although not explicitly shown, chips 10 and 11 may each include additional functionality, and further, may be coupled by additional interconnects (plesiochronous or otherwise). Furthermore, both chips 10 and 11 may be configured to test plesiochronous interconnects from either the transmit side or the receive side. For the sake of simplicity, only a single plesiochronous interconnect is shown here, with chip 10 configured for performing the transmit-side functions of the self-test, while chip 11 is configured for performing the receive-side functions of the self-test.

In the embodiment shown, chip 10 includes a control logic unit 109 which is coupled to an LFSR 104. Control logic unit 109 is configured to initialize the generation of a pseudorandom bit pattern. Upon initial seeding, LFSR 104 is configured to generate a pseudorandom bit pattern in units of n bits. Each subsequent n bits of the pseudorandom bit pattern generated of the LFSR 104 in chip 10 is based on the n bits of the previous state. Upon generation, each unit of n bits is conveyed, in parallel, to serializer 111, which converts the parallel data into serial data. The bits are then conveyed serially to transmitter 91 of chip 10, which is configured to transmit the bits serially over plesiochronous link 100.

Bits transmitted over plesiochronous link to chip 11 are received by receiver 92. After the bits are received, they are conveyed serially to deserializer 102. Deserializer 102 converts each received n bits into n parallel bits. These n bits are then concurrently conveyed to comparator 108 and predictor 120.

Predictor 120 includes a buffer 113 and another LFSR 104. Buffer 113 is configured to provide temporary storage of each received and deserialized n bits so as to allow deserializer to receive and deserialize the next n received bits. The n bits stored in buffer 113 are then provided to LFSR 104. Based on the n bits provided to LFSR 104 of predictor 120, a plurality of n compare bits is generated. The n compare bits represent a prediction of the next n bits received via the plesiochronous link (i.e. what the next n bits are expected to be). Each n bits received an deserialized are provided to LFSR 104 of predictor 120 and are used as a basis of comparison with the next n bits to be received. The n compare bits are conveyed from LFSR 104 of predictor 120 to delay element 106, which allows the next n bits to be received and deserialized. Once sufficient time has elapsed for the next n bits to be received and deserialized, delay element 106 conveys the n compare bits to comparator 106. The next n bits are concurrently conveyed from deserializer 102 to comparator 106, and a compare operation is performed. In this particular embodiment, comparator 108 is configured to provide a signal to increment BER (bit error rate) counter 110 if the next n bits are different from the n compare bits. If the next n bits are the same as the n compare bits, no signal is asserted and BER counter is not incremented.

Thus, for each cycle of testing, LFSR 104 of predictor 120 generates n compare bits for comparison with a next n received bits, while comparing a currently received n bits with n compare bits generated in a previous cycle. As an example, assume a plurality of test cycles designated T=1, T=2, T=3, and so forth. At T=1, a plurality of n bits is transmitted across the plesiochronous link. These n bits deserialized and provided to the LFSR 104 of predictor 120 (by way of buffer 113 in the embodiment shown). These n bits are used to generate n compare bits that represent the bits expected to be received at T=2. At T=2, the next n bits are received, deserialized, and conveyed to comparator 108. Concurrent with the conveying of the next n bits to comparator 108, the n compare bits generated during the cycle T=1 are also conveyed to comparator 108, and a compare operation occurs (and, if necessary, BER counter 110 is incremented). This process repeats itself for the remainder of the test. For example, the n bits received at T=3 are compared with the n compare bits generated at T=2, the n bits received at T=4 are compared with the n compare bits generated at T=3, and so forth. Note that no comparison operation occurs at T=1, since no compare bits have been generated prior to receiving bits at T=1.

Since each n compare bits generated by LFSR 104 of predictor 120 is based on n received bits, any errors in the n received bits will affect the next n compare bits to be generated. If an error occurs during testing, the compare bits generated in one or more cycles subsequent to the error may be incorrect, even if the received bits are correct for the same one or more cycles. Thus, in determining the bit error rate, the false errors that may occur subsequent to a true error must be accounted for. This may be accomplished in various ways, such as adjusting the threshold for an acceptable bit error rate, disabling BER counter 110 or comparator 108 for a predetermined number of cycles subsequent to the error, or other suitable means. Furthermore (as also previously noted), there may be a period defined by a predetermined number of cycles upon initialization of the test wherein errors are not recorded or otherwise ignored, whereby sufficient time is allowed for the bit patterns generated by both LFSRs 104 to be synchronized.

Figure 5:
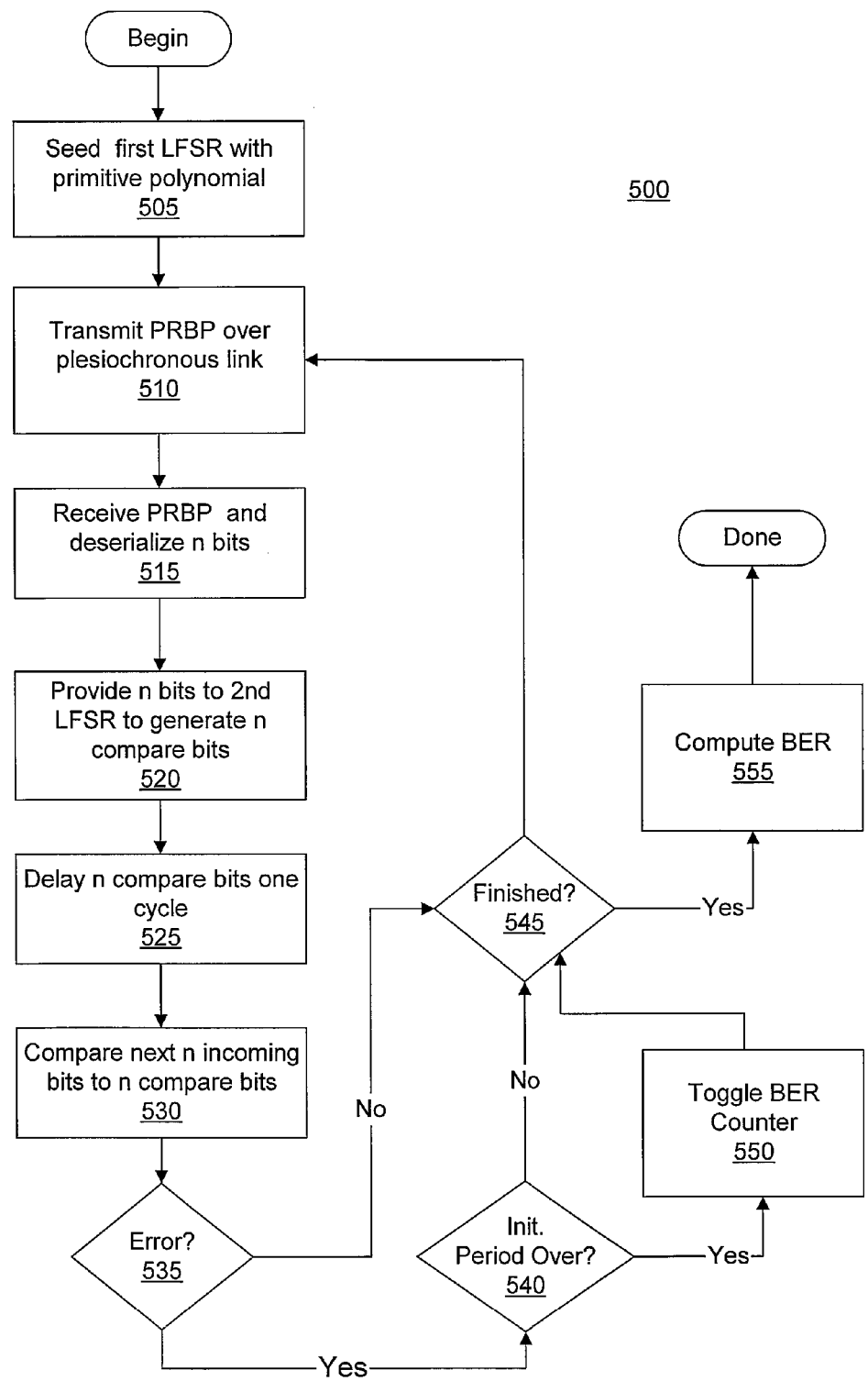
FIG. 5 is a flowchart of one embodiment of a method for self-testing plesiochronous links.

FIG. 5 is a flowchart of one embodiment of a method for self-testing plesiochronous links. In the embodiment shown, testing method 500 begins with seeding the LFSR of the transmitting chip with a primitive polynomial (505). Upon seeding the LFSR, a resulting pseudorandom bit pattern may be transmitted from the transmitting chip over a plesiochronous link (510). Upon receiving bits of the pseudorandom bit pattern, the receiving chip may deserialize n (e.g., 8) received bits (515). It should be noted that embodiments are possible wherein the transmitter and receiver to be tested are on the same chip (e.g., conducting a self-test of a plesiochronous loopback link).

The deserialized n bits are provided to the $2^{nd}$ LFSR (i.e. in the receiving chip) in order to generate n compare bits (520). The n compare bits may be delayed for one cycle (525) prior to being forwarded to a comparator. The delaying of the n compare bits allows sufficient time to receive and deserialize the next n incoming bits and forward them to the comparator. The comparator may then compare the next n incoming bits to the n compare bits (530). As noted above, the n incoming bits received at a cycle T=2 are compared with n compare bits generated in a previous cycle, T=1. Similarly, the n incoming bits at a cycle T=3 may be compared with n compare bits generated at T=2, and so forth.

If an error is present (535), and the initialization period is over (540), a bit error rate counter may be incremented (550). If the test is not finished (545, no), the test continues with the continued transmission of bits over the plesiochronous link. Once the test has been fully run (545, yes), a bit error rate may be computed (555). Based on the computed bit error rate, a determination can be made as to whether the self-test of the plesiochronous link passed or failed. In various embodiments, a passing result may be determined by the bit error rate being below an predetermined level while a failing result is determined by the bit error rate being above the predetermined level.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for performing a self-test of a plesiochronous link, the method comprising:
   generating a first pseudorandom bit pattern;
   transmitting the first pseudorandom bit pattern serially across the plesiochronous link;
   receiving a plurality of n bits from the plesiochronous link;
   deserializing the received plurality of n bits of the first pseudorandom bit pattern into n parallel bits;
   generating a plurality of n compare bits based on the received plurality of n bits;
   providing the plurality of n compare bits to a delay element;
   providing the plurality of n compare bits from the delay element to a comparator, after a predetermined delay; and
   comparing, in the comparator, the plurality of n compare bits to a next plurality of n bits, wherein the next plurality of n bits is obtained by deserializing a next n bits received of the first pseudorandom bit pattern.

2. The method as recited in claim 1 further comprising repeating said deserializing, said generating a plurality of n compare bits, and said comparing for each n bits received of the first pseudorandom bit pattern.

3. The method as recited in claim 2 further comprising determining a bit error rate based on a number of instances of said comparing.

4. The method as recited in claim 2, wherein each plurality of n compare bits is part of a second pseudorandom bit pattern.

5. The method as recited in claim 4, wherein generating the first and second pseudorandom bit patterns comprises initializing the patterns by seeding a first linear feedback shift register with a primitive polynomial and seeding a second linear feedback shift register with a first plurality of bits received via the plesiochronous link, and wherein each subsequent n bits of the second pseudorandom bit pattern is based on each received plurality of n bits.

6. The method as recited in claim 1 further comprising, upon initialization of the self-test, ignoring the results for a pre-determined number of cycles of said comparing, and wherein, upon completion of said predetermined number of cycles, determining whether an error is detected for each cycle of said comparing.

7. The method as recited in claim 1, wherein said transmitting comprises a first chip transmitting the first pseudorandom bit pattern to a receiver in a second chip.

8. The method as recited in claim 7, wherein the first chip is mounted upon a first PCB (printed circuit board) and the second chip is mounted upon a second PCB.

9. The method as recited in claim 1, wherein said transmitting comprises a transmitter in a chip transmitting the first pseudorandom bit pattern to a receiver in the chip.

10. The method as recited in claim 1 further comprising performing the self-test concurrently with performing a self-test for each of a plurality of plesiochronous links.

11. A system comprising:
    a first pseudorandom bit pattern generator configured to generate a first pseudorandom bit pattern;
    a transmitter coupled to receive the first pseudorandom bit pattern;
    a receiver coupled to the transmitter by a plesiochronous link, wherein the transmitter is configured to transmit the first pseudorandom bit pattern to the receiver over the plesiochronous link;
    a deserializer coupled to receive and convert a received plurality of n bits into n parallel bits, wherein the received plurality of n bits is received via the plesiochronous link;
    a second pseudorandom bit pattern generator coupled to receive the n parallel bits and configured to generate a plurality of n compare bits based on the n parallel bits;
    a comparator, wherein the comparator is coupled to receive the plurality of n compare bits and further coupled to receive a next plurality of n bits from the deserializer, wherein the next plurality of n bits is obtained by deserializing a next n bits received of the first pseudorandom bit pattern, wherein the comparator is configured to compare the plurality of n compare bits to the next plurality of n bits; and
    a delay element coupled between an output of the second pseudorandom bit pattern generator and an input of the comparator, wherein the delay element is coupled to receive the plurality of n compare bits from the second pseudorandom bit pattern generator and is configured to convey the plurality of n compare bits to the comparator after a predetermined delay.

12. The system as recited in claim 11, wherein the system is configured to repeat deserializing, generating a plurality of n compare bits, and comparing for each n bits received of the first pseudorandom bit pattern.

13. The system as recited in claim 12, wherein the system is configured to determine a bit error rate based on comparisons performed by the comparator.

14. The system as recited in claim 12, wherein the first pseudorandom bit pattern generator includes a first LFSR (linear feedback shift register), and wherein the second pseudorandom bit pattern generator includes a second LFSR.

15. The system as recited in claim 14, wherein the system is configured to, upon initialization of the self-test, to seed the first LSFR with a primitive polynomial and seed the second LFSR with a first plurality of bits received via the plesiochronous link, and wherein each subsequent n bits of the second pseudorandom bit pattern is based on each received plurality of n bits.

16. The system as recited in claim 11, wherein, upon initialization of the self-test, the system is configured to ignore the results of the comparator for a pre-determined number of cycles, and wherein the system is further configured to, upon completion of the predetermined number of cycles, to determine whether an error is detected for each cycle of said comparing.

17. The system as recited in claim 11, wherein the system includes a first chip configured to transmit the first pseudorandom bit pattern to a second chip.

18. The system as recited in claim 17, wherein the first chip is mounted on a first PCB (printed circuit board) and the second chip is mounted on a second PCB.

19. The system as recited in claim 11, wherein the system includes a chip comprising both the transmitter and the receiver.

20. The system as recited in claim 11, wherein the system includes a plurality of plesiochronous links, and wherein the system is configured to concurrently perform self-tests on the plurality of plesiochronous links.

* * * * *